(12) United States Patent
Wang (10) Patent No.: US 10,254,156 B2
(45) Date of Patent: Apr. 9, 2019

(54) ACTIVE ERROR CORRECTION IN AN OPTICAL SENSOR SYSTEM

(71) Applicant: Halliburton Energy Services, Inc., Houston, TX (US)

(72) Inventor: Yunmiao Wang, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/754,242

(22) PCT Filed: Oct. 29, 2015

(86) PCT No.: PCT/US2015/058042
§ 371 (c)(1),
(2) Date: Feb. 21, 2018

(87) PCT Pub. No.: WO2017/074384
PCT Pub. Date: May 4, 2017

(65) Prior Publication Data
US 2018/0252575 A1 Sep. 6, 2018

(51) Int. Cl.
*G01H 9/00* (2006.01)
*E21B 47/12* (2012.01)

(52) U.S. Cl.
CPC .......... *G01H 9/004* (2013.01); *E21B 47/123* (2013.01); *E21B 47/12* (2013.01); *G01V 2210/1429* (2013.01)

(58) Field of Classification Search
CPC .......... G01H 9/004; G01V 2210/1429; E21B 47/12; E21B 47/123
See application file for complete search history.

(56) References Cited

U.S. PATENT DOCUMENTS

| 5,925,879 A | 7/1999 | Hay |
| 6,173,091 B1 | 1/2001 | Reich |

(Continued)

FOREIGN PATENT DOCUMENTS

WO    2010072293    7/2010

OTHER PUBLICATIONS

Bremer et al., "Fibre Optic Pressure and Temperature Sensor for Geothermal Wells", 10.1109/ICSENS.2010.5690125 Conference: Sensors, 2010 IEEE, GFZ-German Research Centre for Geosciences, Germany, 2010, 4 pages.

(Continued)

*Primary Examiner* — Hai Phan
*Assistant Examiner* — Franklin D Balseca
(74) *Attorney, Agent, or Firm* — Kilpatrick Townsend & Stockton LLP (57) ABSTRACT

An optical sensor system may include an interrogation system coupled to one or more fiber-optic cables positioned in a wellbore. The interrogation system may interrogate a fiber Fabry-Perot interferometric sensor and one or more fiber Bragg sensors multiplexed in the fiber-optic cables. The optical sensor system may include a processing device to determine whether there is condition that may cause an error in the calculation of the cavity length of the fiber Fabry-Perot interferometric sensor in real-time based on a reference distance between peaks or valleys in the reflected light signal generated by the fiber Fabry-Perot interferometric sensor. The processing device may compare the reference distance to a distance between peaks or valleys detected in the spectrum to identify that an error condition exists and may correct the error prior to calculating the cavity length.

20 Claims, 8 Drawing Sheets

(56) References Cited

U.S. PATENT DOCUMENTS

| | | |
|---|---|---|
| 6,281,976 B1 | 8/2001 | Taylor et al. |
| 6,437,326 B1 | 8/2002 | Yamate et al. |
| 7,564,562 B2 | 7/2009 | Choi |
| 8,994,925 B2 * | 3/2015 | Lewis .................. G01S 7/4865 342/118 |
| 9,239,249 B2 * | 1/2016 | Hjort .................. G01M 5/0016 |
| 10,019,550 B2 * | 7/2018 | Cobb ...................... C12Q 1/686 |
| 2005/0088660 A1 * | 4/2005 | Ronnekleiv ........ G01B 9/02007 356/478 |
| 2009/0151423 A1 * | 6/2009 | Wu ....................... G01L 9/0077 73/1.57 |
| 2011/0190640 A1 | 8/2011 | Bremer et al. |
| 2015/0020598 A1 | 1/2015 | Wang |
| 2015/0146209 A1 | 5/2015 | Childers et al. |

OTHER PUBLICATIONS

Han et al., "Signal-processing algorithm for white-light optical fiber extrinsic Fabry-Perot interferometric sensors", Optics Letters, vol. 29, No. 15, Aug. 1, 2004, pp. 1736-1738.

Ma et al., "Signal processing of white-light interferometric low-finesse fiber-optic Fabry-Perot sensors", Applied Optics, vol. 52, No. 2, Center for Photonics Technology, Jan. 4, 2013, pp. 127-138.

International Patent Application No. PCT/US2015/058042 , "International Search Report With Written Opinion", dated Jul. 26, 2016, 12 pages.

\* cited by examiner

FIG. 9

ACTIVE ERROR CORRECTION IN AN OPTICAL SENSOR SYSTEM

TECHNICAL FIELD

The present disclosure relates generally to wellbore fiber-optic systems and, more particularly (although not necessarily exclusively), to methods and systems for correcting errors in a fiber Fabry-Perot interferometric sensor signal caused by multiplexed fiber Bragg grating sensors.

BACKGROUND

Optic sensors may be used for downhole oil and gas applications. For example, optic sensors may be multiplexed on one or more fiber-optic cables and deployed downhole in a wellbore to monitor producing zones and to obtain measurements, such as temperature, strain, pressure, or acoustic measurements, within the wellbore. The optical sensors may be interrogated from the surface of the wellbore using an optical light source and a detector device (e.g., a spectrometer, optical receiver, etc.). An array of optical sensors may include multiple sensor types multiplexed in a fiber-optic cable. In certain conditions, a light signal generated by a sensor having a first type may be adversely distorted by a light signal generated by a sensor of a second type. Distorting a light signal generated by a sensor may cause errors in real-time calculations used to analyze measurements corresponding to the generated light signal.

DETAILED DESCRIPTION

Certain aspects and examples of the present disclosure relate to systems and methods for determining and correcting for errors in a spectrum of light signals generated based on reflected light signals from different types of optical sensors multiplexed in one or more fiber-optic cables. The optical sensors may be included in an optical sensor system having an interrogation system with active error correction for determining abnormal scenarios in which a light signal generated by a first sensor of a first sensor type is distorted by a light signal generated by a second sensor of a second sensor type. In some aspects, the distortion in the light signal from the first sensor may cause errors in determining sensor values used to interpret measurements of the first sensor. The interrogation system may include a spectrometer to receive light signals from the first sensor and the second sensor and generate a spectrum. The spectrometer may be coupled to a processing device configured to determine an abnormal scenario in real-time and correct for the error caused by the distortion prior to performing calculations based on the light signal from the first sensor.

In one example, an optical sensor system according to some aspects of the present disclosure may include a fiber Fabry-Perot interferometric sensor and one or more fiber Bragg grating sensors multiplexed in one or more fiber-optic cables. The fiber Fabry-Perot interferometric sensor may generate a fiber Fabry-Perot interferometric light signal ("FFPI signal") that may be distorted by a fiber Bragg grating light signal ("FBG signal") generated by one of the fiber Bragg grating sensors in a spectrum. In an exemplary abnormal scenario, the FBG signal may distort the FFPI signal at or proximate to a peak or valley of the FFPI signal. An index or count of the peaks or valleys in the spectrum may be used by the processing device to calculate a cavity length of the fiber Fabry-Perot interferometric sensor that may be used to interpret the measurements of the fiber Fabry-Perot interferometric sensor. The distortion may create false peaks or false valleys in the spectrum affecting the calculation of the cavity length of the fiber Fabry-Perot interferometric sensor. The processing device may determine a reference distance between two or more peaks or valleys in a portion of the spectrum dedicated to a wavelength range of the fiber Fabry-Perot interferometric sensor. The reference distance may be compared to a distance between the peaks or valleys detected in a portion of the spectrum having both an FFPI signal and a FBG signal to determine whether a false peak or false valley exists in the spectrum. The presence of a false peak or false valley may indicate an abnormal scenario. In response to an indication of abnormal scenario, the processing device may correct for the false peaks or false valleys in the spectrum prior to calculating the cavity length of the fiber Fabry-Perot interferometric sensor.

The use of a reference distance in a dedicated wavelength range of the spectrum may allow an optical sensor system according to some aspects of the present disclosure to determine and correct for abnormal scenarios causing calculation errors in real-time. The real-time detection by the optical sensor system may provide more efficient and accurate measurements by the optical sensors in the wellbore.

For example, the reflectivity spectrum of a fiber Fabry-Perot interferometric sensor and a fiber Bragg grating sensors may shift depending on a condition in the wellbore a temperature of the optical sensors or a strain in the fiber-optic cable to which the sensors are attached. In some aspects, a result of the shift may cause the FBG signals to interfere with the FFPI signal such that a peak of an FBG signal is positioned at or proximate to the valley of the FFPI signal, creating one or more false valleys in the FFPI signal. The nature of this error may be random and unpredictable, resulting in difficulties in correcting for the error prior to determining the cavity length of the FFPI signal based on the false valleys. Thus, the use of a reference spacing between valleys in a portion of the spectrum having no interference of the FFPI signal by an FBG signal may allow the system to compare the reference spacing to valleys detected in other portions of the spectrum to determine if an abnormal condition is present creating a false valley. Detecting the normal condition may allow the system to correct for the false valley to ensure that the cavity length calculations are accurate measurements of the fiber Fabry-Perot interferometric sensor.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

Figure 1:
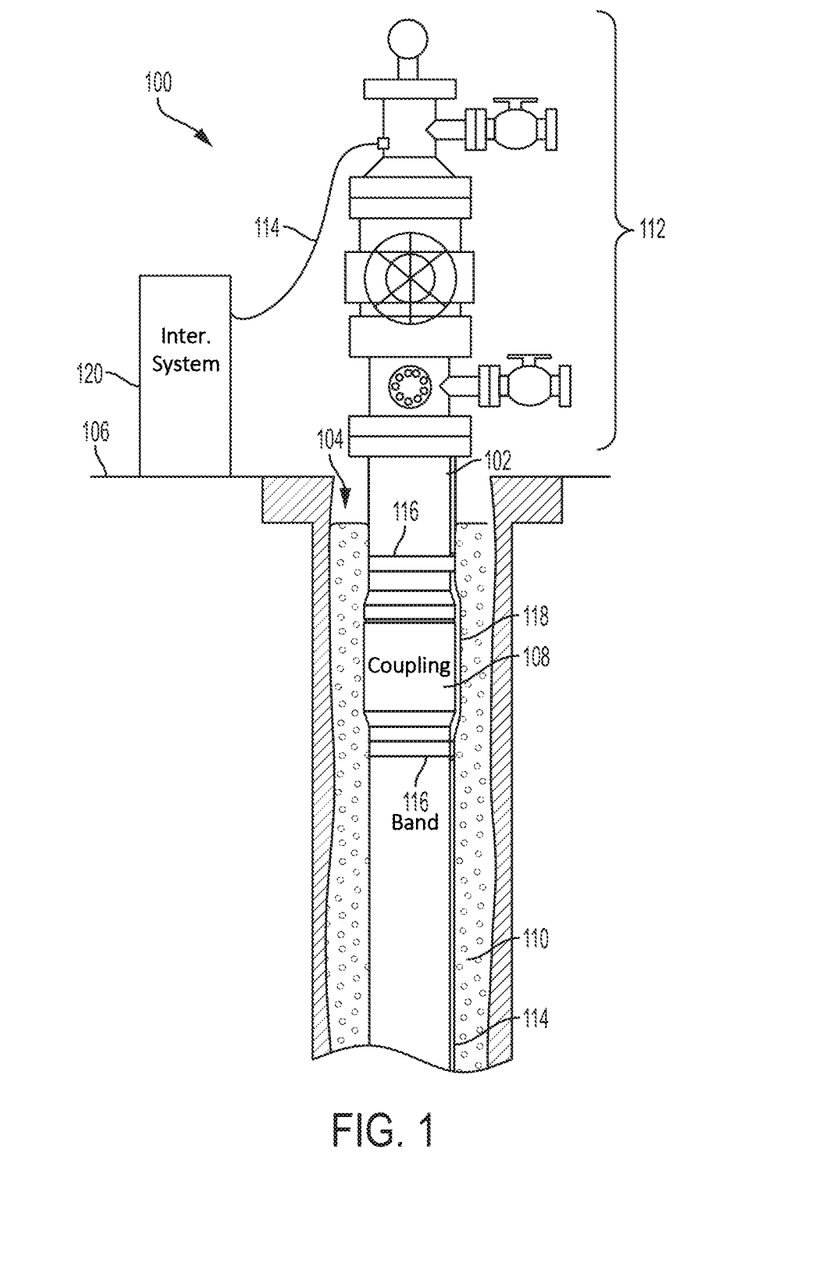
FIG. 1 is a cross-sectional schematic diagram depicting a wellbore environment that may include an interrogation system according to one aspect of the present disclosure.

Various aspects of the present disclosure may be implemented in various environments. FIG. 1 illustrates a non-limiting example of a wellbore environment 100 that may include an interrogation system according to some aspects of the present disclosure. The wellbore environment 100 may include a casing string 102 positioned in a wellbore 104 that has been formed in a surface 106 of the earth. The wellbore environment 100 may have been constructed and completed in any suitable manner, such as by use of a drilling assembly having a drill bit for creating the wellbore 104. The casing string 102 may include tubular casing sections connected by end-to-end couplings 108. In some aspects, the casing string 102 may be made of a suitable material such as steel. Within the wellbore 104, cement 110 may be injected and allowed to set between an outer surface of the casing string 102 and an inner surface of the wellbore 104. At the surface 106 of the wellbore 104, a tree assembly 112 (also known as a "Christmas tree") may be joined to the casing string 102. The tree assembly 112 may include an assembly of valves, spools, fittings, etc. to direct and control the flow of fluid (e.g., oil, gas) into or out of the wellbore 104 within the casing string 102.

Fiber-optic cables 114 may be routed through one or more ports in the tree assembly 112 and extend along an outer surface of the casing string 102. At least one of the fiber-optic cables 114 may include an array of optical sensors along the fiber-optic cable 114. The optical sensors may be deployed in the wellbore 104 and used to sense and transmit measurements of downhole conditions in the wellbore environment 100 to the surface 106. The fiber-optic cables 114 may be held against the outer surface of the casing string 102 at intervals by coupling bands 116 that extend around the casing string 102. A protective covering 118 may be installed over the fiber-optic cables 114 at the coupling 108 of the casing string and may be held in place by at least two of the coupling bands 116 installed on either side of the couplings 108. In some aspects of the present disclosure, the fiber-optic cable 114 may be coupled to and include in an interrogation system 120 at the surface 106 of the wellbore 104. The interrogation system 120 may be an opto-electronic unit that may include devices and components to interrogate sensors coupled to the fiber-optic cables 114. In some aspects, the interrogation system 120 may be configured to send light through one or more of the fiber-optic cables 114 to the sensors. The interrogation system 120 may also receive and measure wavelengths of reflected light from the sensors coupled to the fiber-optic cables.

Figure 2:
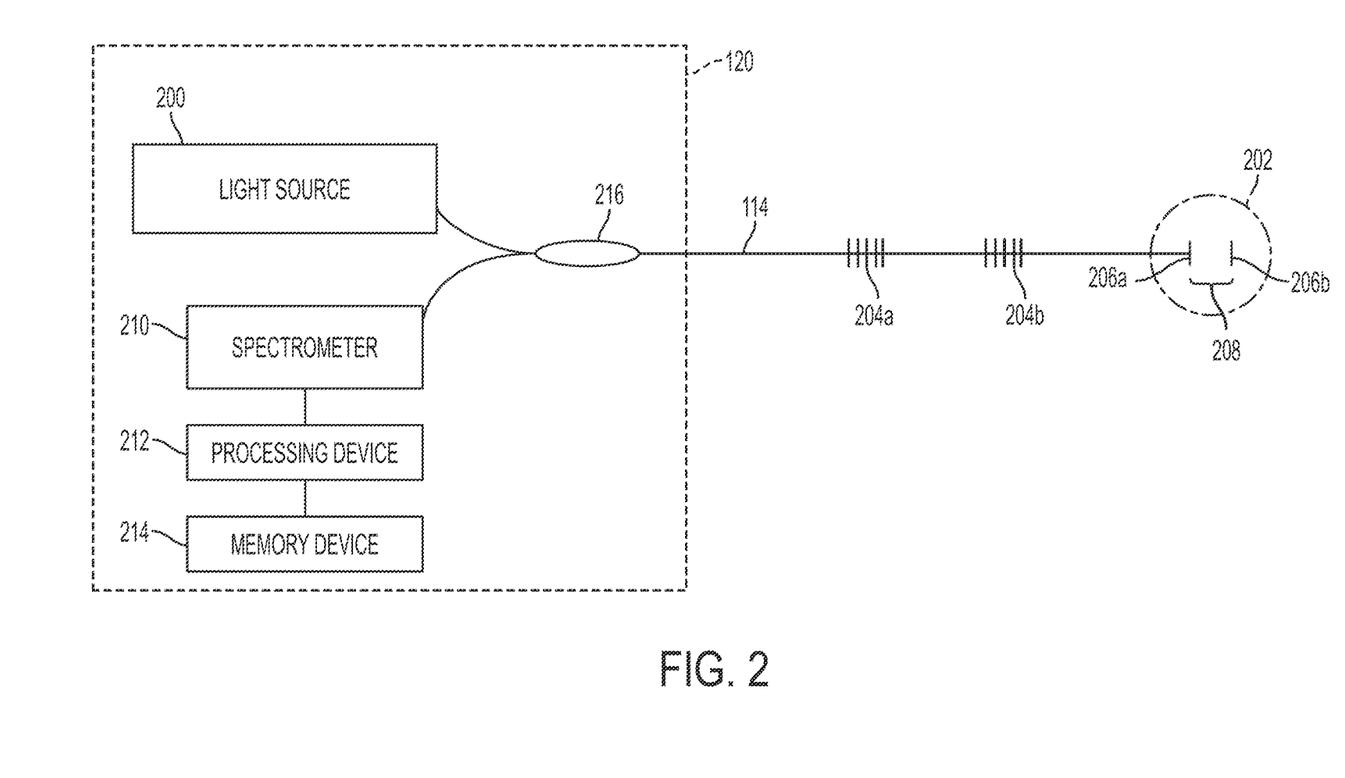
FIG. 2 is a schematic diagram of an example of an optical sensor system including an interrogation system coupled to a fiber Fabry-Perot interferometric sensor and fiber Bragg grating sensors serially multiplexed in a fiber-optic cable according to one aspect of the present disclosure.

FIG. 2 shows a schematic diagram of the interrogation system 120 that may be included in the wellbore environment of FIG. 1. The interrogation system 120 may include a light source 200 coupled to the fiber-optic cable 114. In some aspects, the light source 200 may include a device configured to generate a broadband light source and transmit the broadband light signals to the fiber-optic cable 114. In other aspects, the light source 200 may include a laser device (e.g., a wavelength tunable laser) configured to transmit light signals to the fiber-optic cable. The fiber-optic cable 114 includes a fiber Fabry-Perot interferometric sensor 202 and two fiber Bragg grating sensors 204a, 204b serially multiplexed in the fiber-optic cable 114. The fiber Fabry-Perot interferometric sensor 202 may include two parallel reflective elements 206a, 206b. In some aspects, the reflective elements 206a, 206b may include reflectors within the fiber-optic cable 114. In other aspects, the reflective elements 206a, 206b may be external to the fiber-optic cable 114. Reflective light from the reflective elements 206a, 206b may interfere with each other and create an FFPI signal. The reflective elements may be separated by a certain distance to define a cavity 208 of the fiber Fabry-Perot interferometric sensor 202. The length of the cavity 208 between the reflective elements 206a, 206b may be indicative of a measurement of the fiber Fabry-Perot interferometric sensor 202 as the length of the cavity may change corresponding to a change in the environment of the fiber Fabry-Perot interferometric sensor 202. For example, applying a strain to the fiber Fabry-Perot interferometric sensor 202 may change the physical length of the cavity 208 resulting in phase variation. By measuring the shift of the wavelength spectrum of reflected light generated by the fiber Fabry-Perot interferometric sensor 202, a quantitative measurement of the strain applied to the fiber-optic cable 114 proximate to the fiber Fabry-Perot interferometric sensor 202 may be obtained.

The fiber Bragg grating sensors 204a, 204b may include two partially reflective elements. In some aspects, the partially reflective elements may include a refractive index change or modulation within a core of the fiber-optic cable 114. In response to a broadband light signal transmitted the fiber-optic cable 114 by the light source 200, the partially reflective elements may reflect only the light signals at a specified wavelength (e.g., a Bragg wavelength). Although two fiber Bragg grating sensors 204a, 204b are shown, the fiber-optic cable 114 may include any number of fiber Bragg grating sensors, including one. In some aspects, the fiber Fabry-Perot interferometric sensor 202 and the fiber Bragg grating sensors 204a, 204b may be sensitive to strain and temperature, allowing their use as sensing element in a wellbore environment. In some aspects, the fiber Fabry-Perot interferometric sensor 202 and the fiber Bragg grating sensors may be used in a wellbore (e.g., wellbore 104 of FIG. 1) to monitor producing zones and to obtain measurements relating to a condition of the wellbore. For example, the fiber Fabry-Perot interferometric sensor 202 may be used as single-point sensors for temperature, pressure, strain, and acoustic measurements. In some aspects, multiplexing the fiber Fabry-Perot interferometric sensor 202 and the fiber Bragg grating sensors 204a, 204b in the fiber-optic cable 114 may provide a platform in which several parameters may be measurable. For example, the fiber Fabry-Perot interferometric sensor 202 may be configured to measure strain, the fiber Bragg grating sensor 204a may be configured to measure pressure, and the fiber Bragg grating sensor 204b may be configured to measure temperature.

The light source 200 may interrogate the fiber Fabry-Perot interferometric sensor 202 and the fiber Bragg grating sensors 204a, 204b by transmitting one or more light signals to the fiber Fabry-Perot interferometric sensor 202 and the fiber Bragg grating sensors 204a, 204b via the fiber-optic cable 114. The reflected light signals corresponding to the light signals from the light source 200 may be transmitted to a spectrometer 210 in the interrogation system 120. Although the fiber-optic cable 114 is shown to include a Fabry-Perot interferometric sensor and fiber Bragg grating sensors, the interrogation system 120 may be configured to interrogate optical sensors of various types (e.g., Mach-Zehnder, Michelson, Sagnac, two-mode elliptic core, back-reflective polarimetric, etc.) without departing from the scope of the present disclosure.

The spectrometer 210 may receive the reflected light signals reflected by the fiber Fabry-Perot interferometric sensor 202 and the fiber Bragg grating sensors and generate a spectrum of the reflected light signals. In some aspects, the FFPI signal transmitted from the fiber Fabry-Perot interferometric sensor 202 and the FBG signals transmitted from the fiber Bragg grating sensors 204a, 204b may be superimposed to create the spectrum. The spectrometer 210 may be coupled to a processing device 212 and a memory device 214 to implement signal-processing methods. Although the processing device 212 and the memory device 214 are shown in FIG. 2 as separate from the spectrometer 210, one or both of the processing device 212 and the memory device 214 may be included in the spectrometer 210 without departing from the scope of the present disclosure.

The interrogation system 120 may be coupled to the fiber-optic cable 114 via a coupling device 216. The coupling device 216 may be a passive device for splitting and combing light signals traversing the coupling device 216. In some aspects, the coupling device may be a 3 dB coupler (e.g., a four-port resonant coupler, a hybrid coupler, etc.). In some aspects, half of the light entering a particular port on one side of the coupler may exit from each of two ports on the other side of the coupler. In additional and alternative aspects, the coupling device may be a circulator device that may transfer the light signals unidirectionally from the light source 200 to the fiber-optic cable 114 and from the fiber-optic cable to the spectrometer 210. The coupling device 216 may be configured to prevent the reflected light from being transmitted back toward the light source 200.

Figure 3:
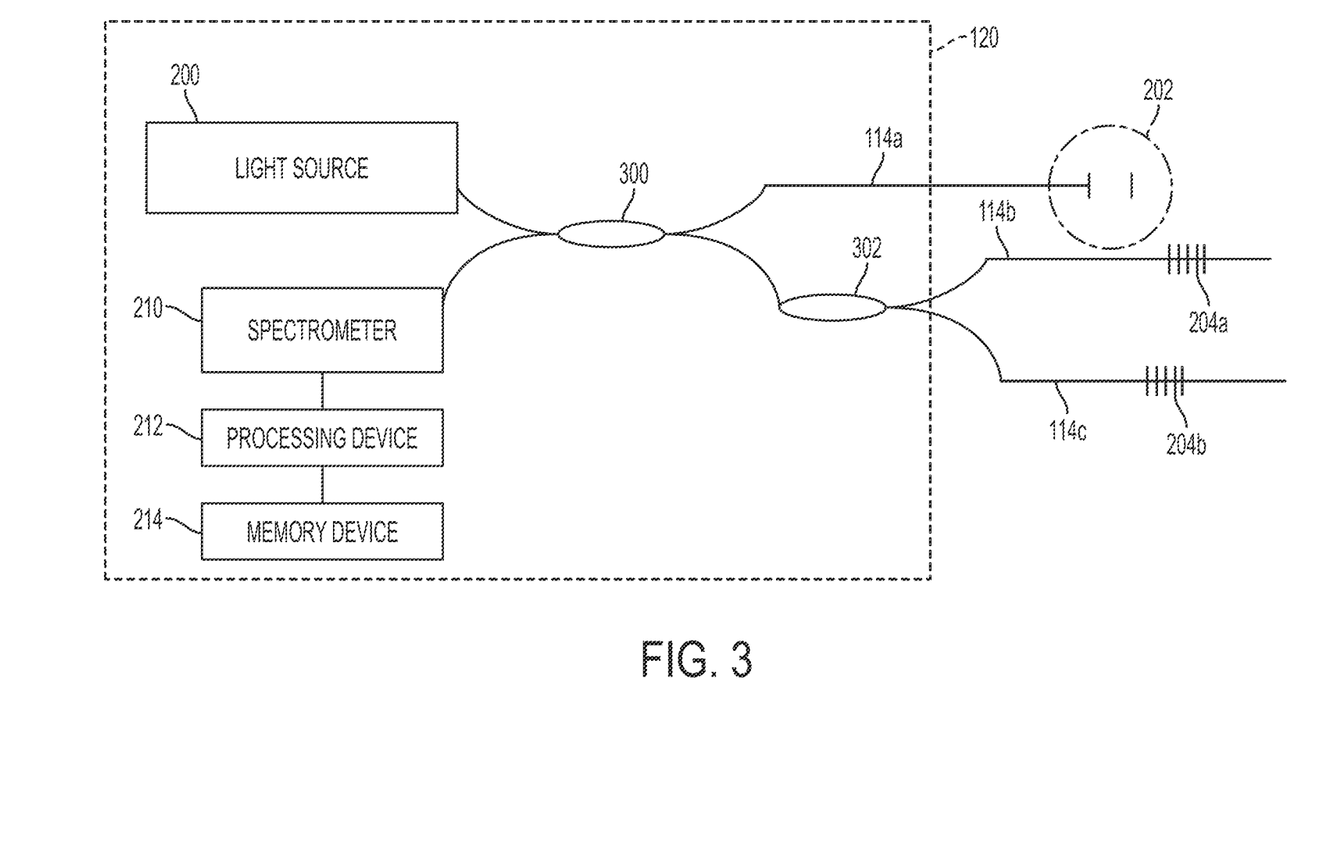
FIG. 3 is a schematic diagram of an example of the interrogation system of FIG. 2 coupled to a fiber Fabry-Perot interferometric sensor and fiber Bragg grating sensors multiplexed in parallel in fiber-optic cables according to one aspect of the present disclosure.

Although the fiber Fabry-Perot interferometric sensor 202 and the fiber Bragg grating sensors 204a, 204b are shown as serially multiplexed on a single fiber-optic cable 114, the fiber Fabry-Perot interferometric sensor 202 and the fiber Bragg grating sensors 204a, 204b may be multiplexed in multiple fiber-optic cables 114 coupled to the interrogation system 120. For example, FIG. 3 shows the interrogation system 120 connected to multiple fiber-optic cables 114a, 114b, 114c. In this configuration, the fiber Fabry-Perot interferometric sensor 202 and the fiber Bragg grating sensors 204a, 204b are multiplexed in parallel in the fiber-optic cables 114a, 114b, 114c. For example, the fiber Fabry-Perot interferometric sensor 202 is multiplexed in fiber-optic cable 114a, the fiber Bragg grating sensor 202a is multiplexed in fiber-optic cable 114b, and the fiber Bragg grating sensor 202b is multiplexed in fiber-optic cable 114c. The fiber-optic cables 114a, 114b, 114c are coupled in parallel by coupling devices 300 and 302. Light signals generated by the light source 200 may be transmitted to the fiber Fabry-Perot interferometric sensor 202 and the fiber Bragg grating sensors 204a, 204b via the fiber-optic cables 114a, 114b, 114c. The coupling device 300 may separate a light signal from the light signal and route the separated light signals toward the fiber Fabry-Perot interferometric sensor 202 in fiber-optic cable 114a and toward the coupling device 302. The coupling device 302 may further separate the light signal to be routed to fiber Bragg grating sensors 204a, 204b in fiber-optic cables 114b, 114c, respectively. The reflected light signals from fiber Bragg grating sensors 204a, 204b may be coupled to the coupling device 302. The reflected light signal from the fiber Fabry-Perot interferometric sensor 202 may be coupled with the reflected light signals from the fiber Bragg grating sensors 204a, 204b and may route the signals to the spectrometer 210.

The spectrometer 210 may be an opto-electrical device that may receive light signals and generate a spectrum of the light signals. In some aspects, the spectrum may include a measurement of the intensity of the light signals as a function of the wavelength or frequency of the light signals. The spectrometer 210 may generate a spectrum including the reflected light signals received from the fiber Bragg grating sensors and may route the spectrum to the processing device 212 for signal processing. The processing device 212 may include a single processing device or multiple processing devices. Non-limiting examples of the processing device 212 may include a microprocessor, an application-specific integrated circuit ("ASIC"), a field-programmable gate array ("FPGA"), etc. The memory device 214 may be coupled to the processing device 212. In some aspects, the memory device 214 may include a non-volatile memory device that retains stored information (e.g., electrically erasable and programmable read-only memory ("EEPROM"), a flash memory, or any other type of non-volatile memory, etc.). In additional and alternative aspects, the memory device 214 may include a medium from which the processing device 212 may read instructions or other stored information for processing the light signals reflected from the fiber Fabry-Perot interferometric sensor 202 and the fiber Bragg grating sensors 204a, 204b. A suitable medium may include electronic, optical, magnetic or other storage devices capable of providing the processing device 212 with instructions or other program code. Non-limiting examples may include a computer-readable medium, including magnetic disks, memory chips, ROM, random-access memory, an ASIC, a configured processor, optical storage, or any other medium from which a computer processor may read instructions. In some aspects, the instructions may include processor-specific instructions generated by a compiler or an interpreter from code written in any suitable computer-programming language, including, for example, C, C++, etc.

In some examples, instructions may include the following general equation for determining the intensity of a light signal reflected by the fiber Fabry-Perot interferometric sensor 202:

$$I(k) = I_0[A + B\cos(kL + \varphi)],$$

where $I_0$ is the intensity of the incident light, A and B are two constants determined by the reflective coefficients of reflective elements 206a, 206b and the coefficients of coupling efficiency of the light reflected into the fiber-optic cable 114, $k=2\pi/\lambda$ is the wavenumber, L is the optical path difference between the two reflective surfaces (e.g., the length of the cavity 208), and $\varphi$ is the initial phase.

The instructions may also include the following equations for determining the peak and valley locations, respectively of in the spectrum in the wavenumber domain:

$$k_i L + \varphi = 2\pi \times (M_0 + i), i = 1, 2, \ldots, M,$$

$$k_j L + \varphi = 2\pi \times (N_0 + j + \tfrac{1}{2}), j = 1, 2, \ldots, N,$$

where i is the index of peak, M is the total number of peaks in the spectrum, j is the index of valley, N is the total number of valleys in the spectrum, and $M_0$ and $N_0$ are integers.

The instructions may also include the following equations for determining the cavity length L based on the peak locations and valley locations in the spectrum, respectively:

$$L = \frac{[2\pi x(M_0 + i) - \varphi]}{k_i}, i = 1, 2, \ldots, M$$

$$L = \frac{\left[2\pi x\left(N + j + \frac{1}{2}\right) - \varphi\right]}{k_j}, j = 1, 2, \ldots, N.$$

The instructions may also include the following equations for determining the distance between peaks or two valleys, respectively, in a spectrum:

$$\Delta k_i = k_{i+1} - k_i = \frac{2\pi}{L}, i = 1, 2, \ldots, M-1$$

$$\Delta k_i = k_{j+1} - k_j = \frac{2\pi}{L}, j = 1, 2, \ldots, N-1$$

The distance between any two peaks or any two valleys may be a constant. The instructions may also include the following equations for comparing the distances between peaks or valleys, respectively, in a spectrum:

$$r = \left| \frac{\Delta k}{\Delta k_{ref}} - 1 \right|,$$

where $\Delta k_{ref}$ represents a reference distance between two peaks or valleys in the spectrum known to be actual peaks or valleys, respectively, and r is a percentage value representing how far the peak or valley distance departs from the reference distance. In some aspects, a smaller r value may indicate a peak or valley distance close to the reference distance. An r value larger than a pre-defined threshold may indicate an error in the peak or valley distance. In additional and alternative aspects, one peak or valley may be used to calculate two neighboring distances. If both neighboring distances yield a ratio beyond the threshold, the peak or valley may be a false signal and may require corrections prior to further calculations.

Figure 4:
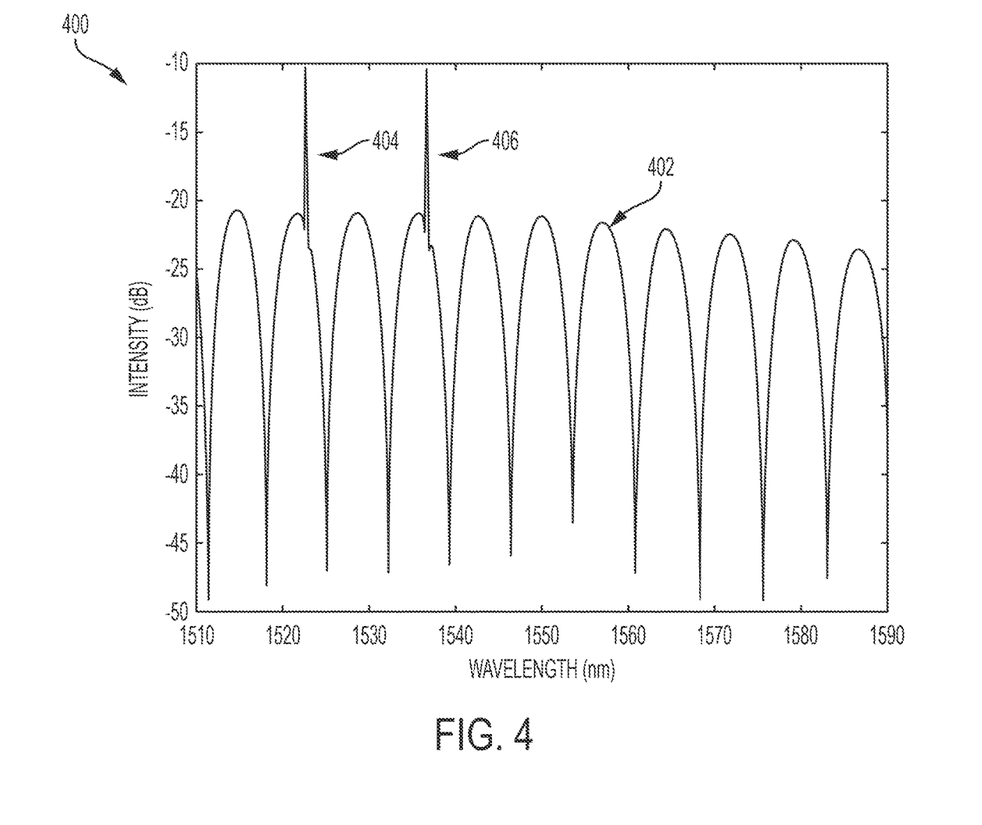
FIG. 4 is a graphical view of an example of a spectrum generated using reflected light from the fiber Fabry-Perot interferometric sensor and fiber Bragg grating sensors of FIG. 2 or 3 according to one aspect of the present disclosure.

FIG. 4 is a graphical view of an example of a spectrum 400 that may be generated by the spectrometer 210 in FIGS. 2 and 3. The spectrum 400 includes an FFPI signal 402, measured in terms of intensity, that may be generated by the fiber Fabry-Perot interferometric sensor 202 of FIGS. 2 and 3. The spectrum 400 also includes spectra of FBG signals 404, 406, measured in terms of intensity, that may be generated by the fiber Bragg grating sensors 204a, 204b, respectively of FIGS. 2 and 3. Due to the fiber Fabry-Perot interferometric sensor 202 and the fiber Bragg grating sensors 204a, 204b being multiplexed, the spectrum 400 may be include a superimposition of the FFPI signal 402 and the FBG signals 404, 406. The horizontal axis corresponds to the wavelength of the FFPI signal 402 and the FBG signals 404, 406 in nanometers. The vertical axis corresponds to the intensity of the FFPI signal 402 and the FBG signals 404, 406 in decibels. In some aspects, the reflectivity spectrum of the fiber Bragg grating sensors 204a, 204b may be configured to be greater than a maximum reflective power of an FFPI signal 402 and the bandwidth of the FBG signals 404, 406 may be narrow (e.g., on the order of 0.1 nanometers). In this configuration, detecting the Bragg wavelength of the fiber Bragg grating sensors 204a, 204b may not be affected by the fiber Fabry-Perot interferometric sensor 202. But, the FFPI signal 402 may be adversely distorted by the FBG signals 404, 406 as shown in FIG. 4. For example, the spectrum 400 may be dominated by the FFPI signal 402, but the peaks of FBG signals 404, 406 deviate from the FFPI signal 402. In spectrum 400, the deviations of the FBG signals 404, 406 occur proximate to peaks of the FFPI signal 402. In aspects, the proximity of the peaks of the FBG signals 404, 404 to the peaks of the FFPI signal 402 may cause errors in the calculation of the length of the cavity 208 of the fiber Fabry-Perot interferometric sensor 202. For example, the processing device 212 may improperly identify a peak of the FBG signal 404 as an additional peak of the FFPI signal 402 when the peak of the FBG signal 404 is positioned at or proximate to a peak of the FFPI signal 402. The false peak may cause calculation errors in determining the cavity length of the fiber Fabry-Perot interferometric sensor 202 by the processing device 212 by the processing device 212 using the instruction for calculating cavity length based on the peak locations in the spectrum 400. Similar errors may occur when a peak of the FBG signal 404 is positioned at or proximate to a valley of the FFPI signal 402 and creates a false valley. In some examples, an environmental condition change (e.g., a change in temperature or pressure in the wellbore 104), the relative peak position of the FBG signals 404, 406 to the FFPI signal 402 may change accordingly and be positioned on a peak or valley of the FFPI signal 402.

Figure 5:
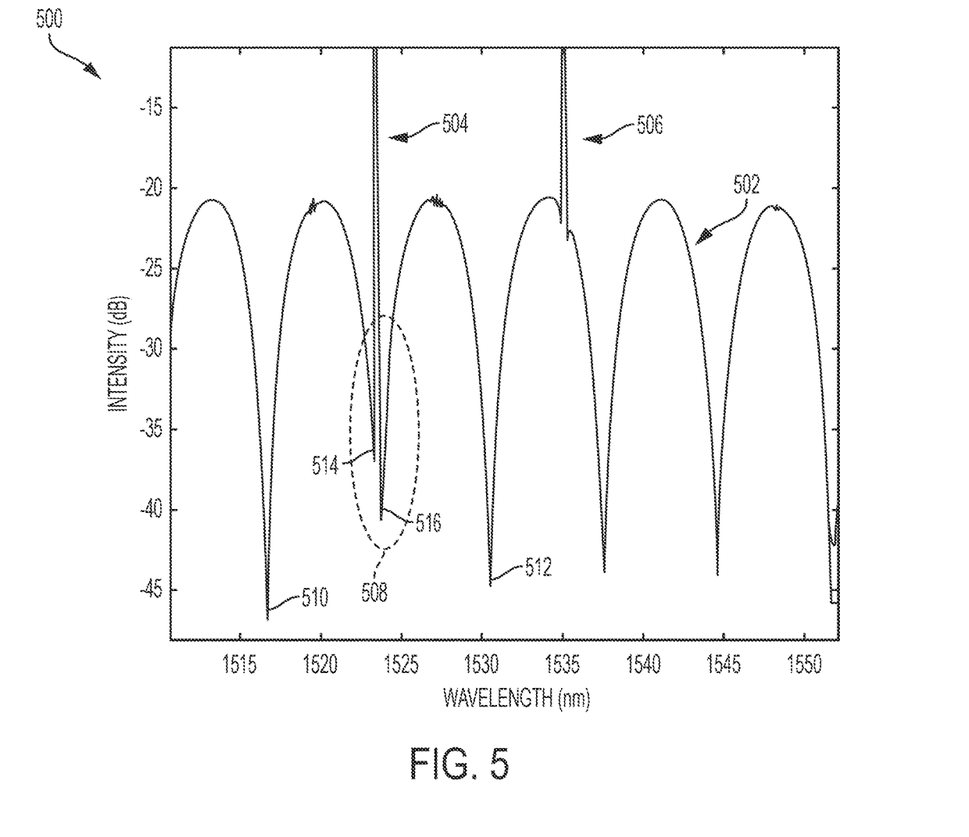
FIG. 5 is a graphical view of a second example of spectrum generated using reflected light from the fiber Fabry-Perot interferometric sensor and fiber Bragg grating sensors of FIG. 2 or 3 according to one aspect of the present disclosure.

FIG. 5 shows a graphical view of another example of a spectrum 500 that may be generated by the spectrometer 210 in FIGS. 2 and 3. The spectrum 500 includes a spectrum of an FFPI signal 502 that may be generated by the fiber Fabry-Perot interferometric sensor 202 of FIGS. 2 and 3. The spectrum 500 also includes spectra of FBG signals 504, 506 that may be generated by the fiber Bragg grating sensors 204a, 204b, respectively of FIGS. 2 and 3. In the scenario shown in spectrum 500, a peak of the FBG signal 504 is positioned at a valley of the FFPI signal 502 creating a distortion in the FFPI signal 502 in the spectrum region 508. In determining a location and number of valleys in the FFPI signal 502 for determining the length of the cavity 208, the processing device 212 may improperly include false valleys in the determination, causing an error in the calculation. For example, valleys 510, 512 may represent actual valleys of the FFPI signal 502 in the spectrum 500. But, valleys 514, 516 may represent false valleys created by the distortion of the FFPI signal 502 by the FBG signal 504.

Figure 6A:
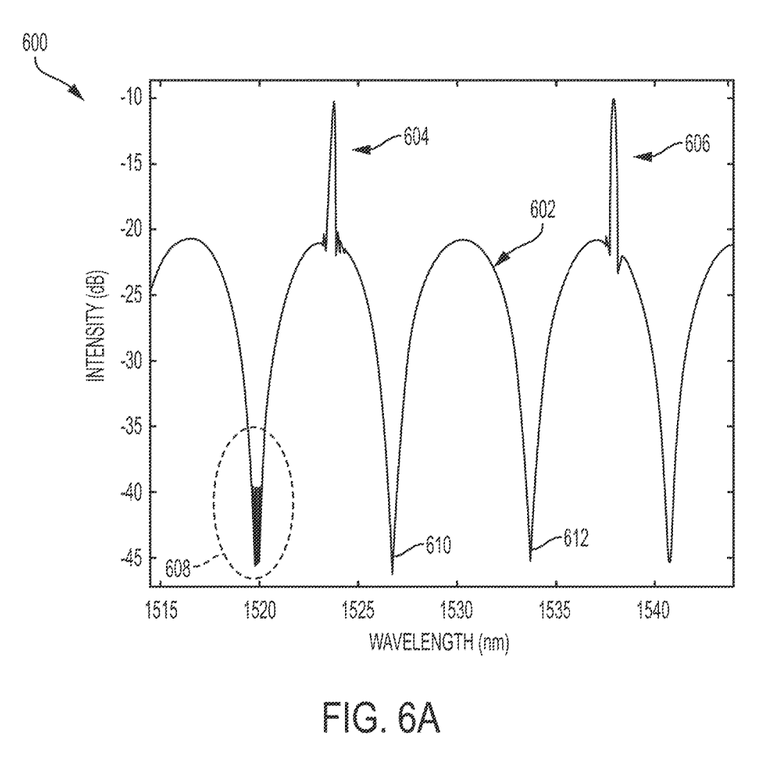
FIG. 6A is a graphical view of a third example of spectrum generated using reflected light from the fiber Fabry-Perot interferometric sensor and fiber Bragg grating sensors of FIG. 2 or 3 according to one aspect of the present disclosure.
Figure 6B:
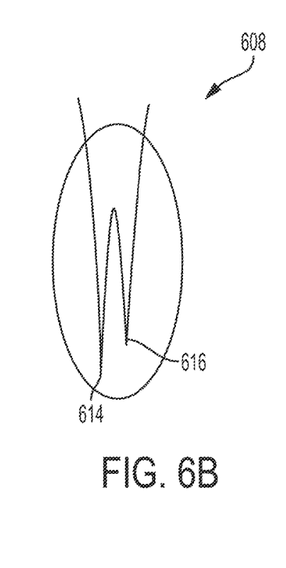
FIG. 6B is an enlarged view of a portion of the spectrum of FIG. 6A according to one aspect of the present disclosure.

FIGS. 6A and 6B shows graphical view of another example of a spectrum 600 that may be generated by the spectrometer 210 in FIGS. 2 and 3. In FIG. 6A, the spectrum 600 includes a spectrum of an FFPI signal 602 that may be generated by the fiber Fabry-Perot interferometric sensor 202 of FIGS. 2 and 3. The spectrum 600 also includes spectra of FBG signals 604, 606 that may be generated by the fiber Bragg grating sensors 204a, 204b, respectively of FIGS. 2 and 3. In the spectrum 600 shown in FIG. 6A, the peaks of the FBG signals 604, 606 are positioned on an edge of the FFPI signal 602 and away from the valleys of the FFPI signal 602. But a second-harmonic peak of one of the FBG signals 604, 606 may cause a distortion of the FFPI signal 602 in the spectrum region 608. In some aspects, the second-harmonic peak may be located at several nanometers relative to the Bragg wavelength (e.g., <±5 nanometers), determined by the grating pitch of the fiber Bragg grating sensors 204a, 204b. FIG. 6B shows an enlarged view of the spectrum region 608. Similar to the scenario described with respect to the spectrum 500 of FIG. 5, the processing device 212 may improperly locate or count false valleys created by the distortion in determining the length of the cavity 208 of the fiber Fabry-Perot interferometric sensor 202. For example, the processing device 212 may identify actual peaks 610, 612 shown in FIG. 6A. But, the processing device 212 may also identify false peaks 614, 616 in the spectrum region 608 shown in FIG. 6B.

Figure 7:
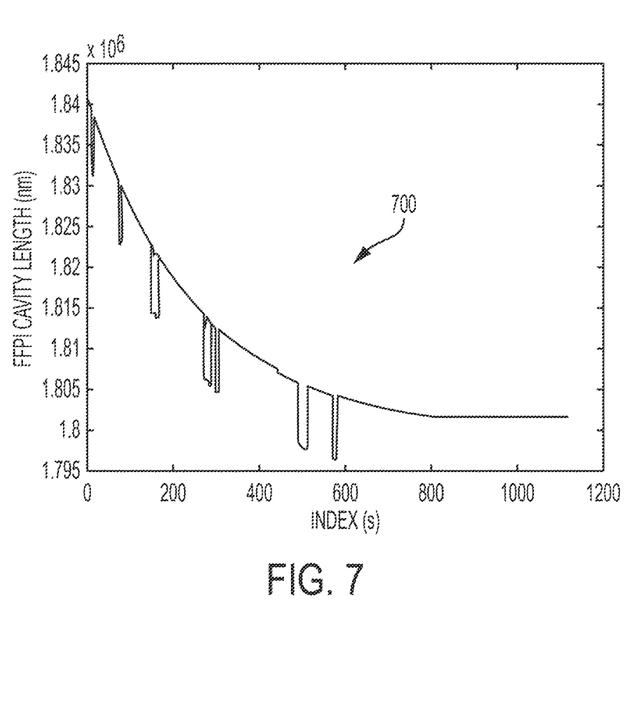
FIG. 7 is a graphical view of an example of a measurement of a cavity length of the fiber Fabry-Perot interferometric sensor prior to correcting for errors in a spectrum according to one aspect of the present disclosure.
Figure 8:
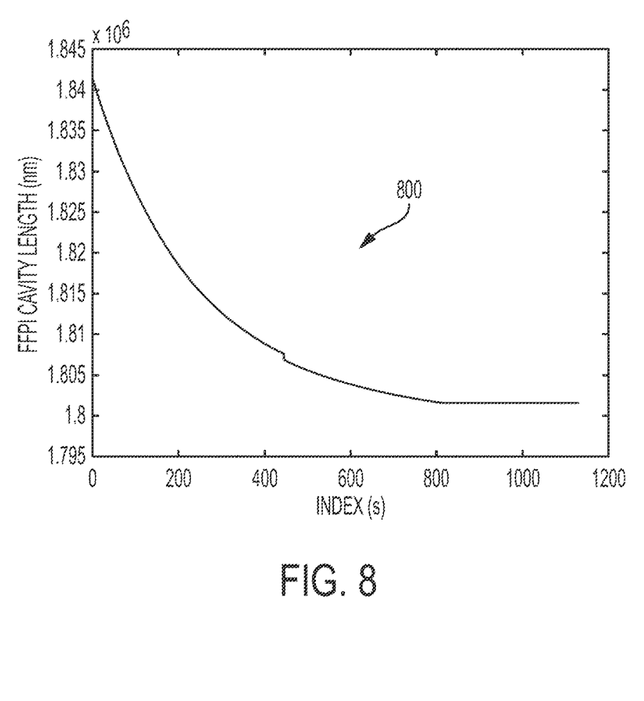
FIG. 8 is a graphical view of an example of a measurement of a cavity length of the fiber Fabry-Perot interferometric sensor after correcting for errors in a spectrum according to one aspect of the present disclosure.

FIGS. 7 and 8 show a graphical view of the length of the cavity 208 of the fiber Fabry-Perot interferometric sensor 202 in FIGS. 2 and 3 over time. The horizontal axis corresponds to the time in seconds. The vertical axis corresponds to the length of the cavity 208 in nanometers. In FIG. 7, cavity length signal 700 represents a calculation of the length of the cavity 208 by the processing device recorded over time. The signal 700 includes several deviations representing errors in the calculation of the cavity length by the processing device 212. In some aspects, the errors in the calculation of the cavity length may be caused by the distortion of the light signals generated by the fiber Fabry-Perot interferometric sensor 202 due to interference by the light signals generated by one or both of the fiber Bragg grating sensors 204a, 204b.

In FIG. 8, cavity length signal 800 represents a calculation of the length of the cavity 208 by the processing device recorded over time. The conditions of the environment surrounding the fiber Fabry-Perot interferometric sensor 202 may be the same as the conditions during the calculation of the signal 700 shown in FIG. 7. But, the signal 800 may include minimal to no deviations and may form a smooth signal 800. The signal 800 may represent a calculation of the length of the cavity 208 of the fiber Fabry-Perot interferometric sensor 202 of FIG. 2 over time where no errors in the calculation are caused by the interference of the fiber Bragg grating sensors 204a, 204b.

Figure 9:
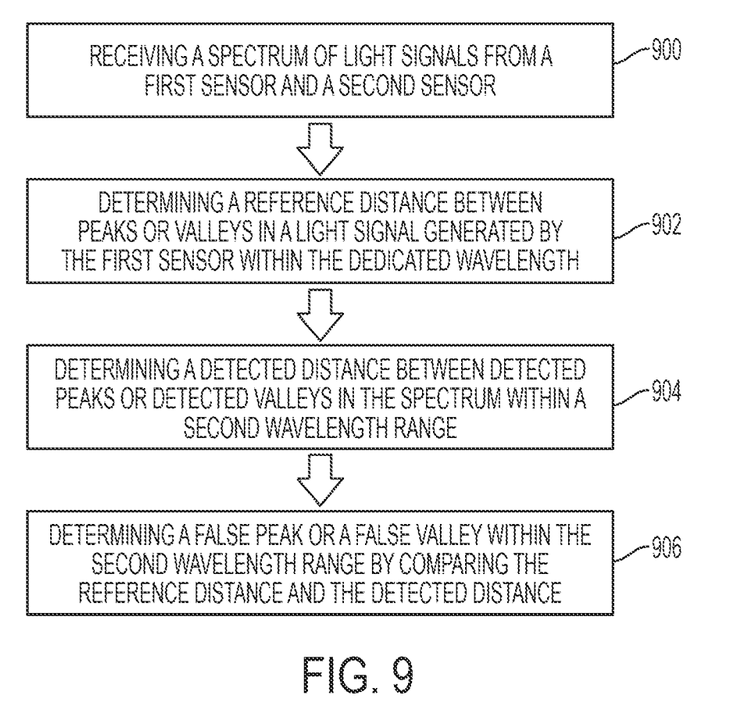
FIG. 9 is a flowchart of an example of a process for correcting error in a spectrum according to one aspect of the present disclosure.

FIG. 9 is a flowchart showing an example of a process for correcting error in an optical sensor system having an fiber Fabry-Perot interferometric sensor 202 and one or more fiber Bragg grating sensors 204a, 204b according to one aspect of the present disclosure. The process is primarily described with respect to FIGS. 2, 4, and 5, although additional implementations are possible without departing from the scope of the present disclosure.

In block 900, a spectrum 400 is received based on reflection light signals from the fiber Fabry-Perot interferometric sensor 202 and the fiber Bragg grating sensors 204a, 204b. In some aspects, the spectrum 400 may be generated by the spectrometer 210 and routed to the processing device 212. The spectrum 400 may include FFPI signal 402 generated by the fiber Fabry-Perot interferometric sensor 202. The spectrum 400 may also include one or more of the FBG signals 404, 406. In some aspects, the FBG signals 404, 406 may interfere with the FFPI signal 502 such that the FFPI signal 402 and FBG signals 404, 406 are superimposed in the spectrum 400.

In block 902, the processing device 212 may determine a distance between the peaks or valleys in the light signal generated by the fiber Fabry-Perot interferometric sensor 202 within the wavelength range dedicated to the fiber Fabry-Perot interferometric sensor 202. In some aspects, the fiber Fabry-Perot interferometric sensor 202 may operate in a predetermined wavelength range such that the reflection light signals generated by the fiber Fabry-Perot interferometric sensor 202 are within the determined wavelength range in the spectrum 400. Similarly, the fiber Bragg grating sensors 204a, 204b may operate in a predetermined wavelength range such that the FBG signals generated by the fiber Bragg grating sensors 204a, 204b are within the determined wavelength range in the spectrum 400. In some aspects, during configuration of the sensor array including the fiber Fabry-Perot interferometric sensor 202 and the fiber Bragg grating sensors 204a, 204b, the Bragg wavelengths corresponding to the fiber Bragg grating sensors 204a, 204b may be specified to reserve a wavelength range dedicated for FFPI signals generated by the fiber Fabry-Perot interferometric sensor 202. For example, in FIG. 4, a dedicated wavelength range for the FFPI signal 402 may be determined between approximately 1560 nanometers and 1590 nanometers. In this portion of the spectrum, no FBG signals 404, 406 may interfere with the FFPI signal 402. The processing device 212 may be configured to select valleys within this dedicated wavelength range. The processing device 212 may execute an instruction stored in the memory device 214 to determine the distances between the valleys. Since the wavelength range from which the valleys were selected is dedicated to the FFPI signal 402, the valleys within this wavelength range are actual valleys of the FFPI signal 402 (e.g., not distorted by FBG signals 404, 406). The distance between valleys of a light signal should be a constant value in the spectrum 400. Thus, the distance between the valleys within the dedicated wavelength range may represent a reference distance to determine potential false valleys in the remaining wavelength range of the spectrum 400.

In block 904, the processing device 212 may determine a distance between the peaks or valleys in the spectrum 400 in a portion of the spectrum where the light signal from the fiber Fabry-Perot interferometric sensor 202 and the light signal from the fiber Bragg grating sensor 202a interfere. The portion of the spectrum 400 may include a portion of the spectrum 400 outside of the wavelength range dedicated to the FFPI signal 402 (e.g., 1510 nanometers to 1560 nanometers). The processing device 212 may select of the valleys within this wavelength range and may execute an instruction stored in the memory device 214 to determine the distance between the valleys.

In block 906, the processing device 212 determines a false valley detected within the portion of the spectrum 400 outside of the dedicated wavelength range are false valley. The false valleys included in the spectrum 400 may be a result of one or more distortions in the FFPI signal 402 caused by positioning of a peak or valley of one of the FBG signals 404, 406 on or proximate to a valley of the FFPI signal 402. The processing device 212 may determine a false valley by comparing the distance between two valleys outside of the dedicated range to the reference distance between the two valleys within the dedicated range using instructions stored in the memory device 214. In some aspects, comparing the distances may yield a percentage value representing an expected size of the valley. The processing device 212 may determine that the distance between the selected valleys is too large or too small when the percentage value is above a predetermined threshold (e.g., a threshold determined by an operator during configuration of the fiber Fabry-Perot interferometric sensor 202 and the fiber Bragg grating sensors 204a, 204b). A percentage value greater than the predetermined threshold may indicate that one of the selected valleys outside of the dedicated range is a false peak.

In some aspects, this determination may be indicative of an abnormal scenario where a peak or valley of one of the FBG signals 404, 406 is positioned on a valley of the FFPI signal 402 to create the false peak. Referring back to FIG. 5, for example, the processing device 212 may select valleys 510, 514 and calculate a distance between them. The calculated distance may be compared to the reference distance, yielding a percentage value greater than a predetermined threshold of 5%. In some aspects, valley 514 may be used to calculate two neighboring valley distances, one valley preceding valley 510 and a second distance after valley 516. For a false valley, both neighboring valley distances may be farther apart from the reference distance. The processing device 212 may determine that the selected valley 514 is a false valley. The processing device 212 may discard the valley 514 prior to calculating the length of the cavity 208 of the fiber Fabry-Perot interferometric sensor 202.

In some aspects, the processing device may calculate the length of the cavity 208 using instructions stored in the memory device 214. For example, to determine a total number of valleys in the spectrum 500, the processing device 212 may omit the detected valleys 514, 516 in the spectrum region 508. The processing device 212 may average the remaining valleys in the spectrum 500 to determine a value representing the total number of valleys in the spectrum and apply that value to an algorithm stored in the memory device 214. Averaging the valleys in the spectrum 500 may allow the processing device 212 to use only a portion of the spectrum 500 to determine a value for the total number of valleys used in executing the algorithm to calculate the length of the cavity 208. For example, the processing device 212 may index valleys 510, 512 in the wavelength range of 1515 nanometers to 1535 nanometers and average them by a number of expected valleys within the wavelength range based on the reference distance described above with respect to block 902 (e.g., three valleys). But, generally the more valleys used in determining the cavity length, the higher the resolution of the cavity length signal 800 representing the length of the cavity 208 over time. Although the process is described with respect to valleys in the spectrum, the process may be similarly applied to peaks in the spectrum without departing from the scope of the present disclosure.

In some aspects, optical sensor systems may be provided according to one or more of the following examples:

Example #1

An interrogation system may include a spectrometer couplable to one or more fiber-optic cables to receive a spectrum of light signals from a first sensor and a second sensor multiplexed in the one or more fiber-optic cables. The first sensor may have a first type and the second sensor having a second type. The interrogation system may also include a processing device couplable to the spectrometer and accessible to instructions that are executable by the processing device to cause the processing device to determine a reference distance between peaks or valleys detected within a dedicated wavelength range of the first sensor, the reference distance being useable to determine false peaks or false valleys within the spectrum.

Example #2

The interrogation system of Example #1 may feature the first sensor including a fiber Fabry-Perot interferometric sensor and the second sensor including a fiber Bragg grating sensor. The fiber Fabry-Perot interferometric sensor may have a first wavelength range to generate an FFPI signal receivable by the spectrometer and the fiber Bragg grating sensor may have a second wavelength range to generate an FBG signal receivable by the spectrometer. The second wavelength range may be sized to create the dedicated wavelength range within the first wavelength range that does not overlap with the second wavelength range.

Example #3

The interrogation system of Examples #1-2 may feature the fiber Fabry-Perot interferometric sensor or the fiber Bragg grating sensor being positionable in a wellbore to sense one or more of (i) a temperature in the wellbore, (ii) sound in the wellbore, (iii) a pressure applied to the one or more fiber-optic cables in the wellbore, or (iv) a strain applied to the one or more fiber-optic cables in the wellbore.

Example #4

The interrogation system of Examples #1-3 may also include a memory device including instructions executable by the processing device for causing the processing device to determine a detected distance between detected peaks or detected valleys within the spectrum within a shared wavelength range of the first sensor and the second sensor. The memory device may also include instructions executable by the processing device for causing the processing device to determine the false peaks or the false valleys within the spectrum by comparing the detected distance and the reference distance.

Example #5

The interrogation system of Example #4 may feature the memory device including instructions executable by the processing device for causing the processing device to determine a cavity length of the first sensor by discarding the false peaks or the false valleys from a count of the peaks or the valleys within the spectrum.

Example #6

The interrogation system of Example #4 may feature the memory device including instructions executable by the processing device for causing the processing device to determine a cavity length of the first sensor by calculating an ideal position of the false peaks or the false valleys using the reference distance.

Example #7

The interrogation system of Examples #1-6 may feature the first sensor and the second sensor being serially multiplexed on one of the one or more fiber-optic cables.

Example #8

The interrogation system of Example #1-6 may feature the first sensor and the second sensor being multiplexed in parallel in the one or more fiber-optic cables.

Example #9

An optical sensor system may include a first sensor positionable in a wellbore to generate a first signal. The optical sensor system may also include a second sensor positionable in the wellbore to generate a second signal. The optical sensor system may also include a processing device couplable the first sensor and the second sensor for which instructions executable by the processing device are used to cause the processing device to determine a reference distance between peaks or valleys detected in the first signal within a dedicated wavelength range of the first sensor. The reference distance may be useable to determine false peaks or false valleys within a spectrum of light signals including the first signal and the second signal.

Example #10

The optical sensor system of Example #9 may also include a spectrometer couplable to the first sensor and the second sensor to receive the spectrum of light signals.

Example #11

The optical sensor system of Examples #8-9 may also include a memory device including instructions executable by the processing device for causing the processing device to determine a detected distance between detected peaks or detected valleys in the spectrum within a shared wavelength range of the first sensor and the second sensor. The memory device may also include instructions executable by the processing device for causing the processing device to determine the false peaks or the false valleys within the spectrum by comparing the detected distance and the reference distance.

Example #12

The optical sensor system of Example #11 may feature the first sensor including a fiber Fabry-Perot interferometric sensor and the second sensor including a fiber Bragg grating sensor. The memory device may include instructions executable by the processing device for causing the processing device to determine a cavity length of the fiber Fabry-Perot interferometric sensor by discarding the false peaks or the false valleys from a count of the peaks or the valleys within the spectrum.

Example #13

The optical sensor system of Examples #9-12 may also include a light source couplable to the first sensor and the second sensor to transmit interrogation light signals to the first sensor and the second sensor.

Example #14

The optical sensor system of Examples #9-13 may feature the first sensor and the second sensor being serially multiplexed on a fiber-optic cable.

Example #15

The optical sensor system of Example #9-13 may feature the first sensor and the second sensor being multiplexed in parallel in two or more fiber-optic cables.

Example #16

A method may include receiving a spectrum of light signals. The spectrum may include a first light signal from a first sensor positioned in a wellbore and a second light signal from a second sensor positioned in the wellbore. The first light signal may have a first wavelength range and the second light signal may have a second wavelength range sized to create a dedicated wavelength range within the first wavelength range that does not overlap with the second wavelength range. The method may also include determining a reference distance between peaks or valleys in the first light signal within the dedicated wavelength range. The method may also include determining a detected distance between detected peaks or detected valleys in the spectrum within the second wavelength range. The method may also include determining a false peak or a false valley within the second wavelength range by comparing the reference distance and the detected distance.

Example #17

The method of Example #16 may feature determining the false peak or the false valley to include comparing the detected distance and the reference distance to generate a percentage value representing a size of an expected distance between actual peaks or actual valleys within the spectrum. The method may also feature determining the false peak or the false valley to include identifying the false peak or the false valley in response to the percentage value being greater than a predetermined threshold value.

Example #18

The method of Examples #16-17 may also include calculating a cavity length of the first sensor by discarding the false peak or the false valley from a count of the detected peaks or the detected valleys within the spectrum.

Example #19

The method of Examples #16-18 may feature the first sensor and the second sensor being serially multiplexed in a fiber-optic cable positioned in the wellbore.

Example #20

The method of Examples #16-18 may feature the first sensor and the second sensor being multiplexed in parallel in fiber-optic cables positioned in the wellbore.

The foregoing description of the examples, including illustrated examples, has been presented only for the purpose of illustration and description and is not intended to be exhaustive or to limit the subject matter to the precise forms disclosed. Numerous modifications, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. An interrogation system, comprising:
a spectrometer couplable to one or more fiber-optic cables to receive a spectrum of light signals from a first sensor and a second sensor multiplexed in the one or more fiber-optic cables, the first sensor having a first type and the second sensor having a second type; and
a processing device couplable to the spectrometer and accessible to instructions that are executable by the processing device to cause the processing device to determine a reference distance in a wavenumber domain between peaks or valleys detected within a dedicated wavelength range of the first sensor, the reference distance being useable to determine false peaks or false valleys introduced within the spectrum by interference from the second sensor.

2. The interrogation system of claim 1, wherein the first sensor includes a fiber Fabry-Perot interferometric sensor and the second sensor includes a fiber Bragg grating sensor, the fiber Fabry-Perot interferometric sensor having a first wavelength range to generate an FFPI signal receivable by the spectrometer and the fiber Bragg grating sensor having a second wavelength range to generate an FBG signal receivable by the spectrometer,
wherein the second wavelength range is sized to create the dedicated wavelength range within the first wavelength range that does not overlap with the second wavelength range.

3. The interrogation system of claim 2, wherein the fiber Fabry-Perot interferometric sensor or the fiber Bragg grating sensor is positionable in a wellbore to sense one or more of (i) a temperature in the wellbore, (ii) sound in the wellbore, (iii) a pressure applied to the one or more fiber-optic cables in the wellbore, or (iv) a strain applied to the one or more fiber-optic cables in the wellbore.

4. The interrogation system of claim 1, further comprising a memory device including instructions executable by the processing device for causing the processing device to:
determine a detected distance between detected peaks or detected valleys within the spectrum within a shared wavelength range of the first sensor and the second sensor; and
determine the false peaks or the false valleys within the spectrum by comparing the detected distance and the reference distance.

5. The interrogation system of claim 4, wherein the memory device includes instructions executable by the processing device for causing the processing device to:
determine a cavity length of the first sensor by discarding the false peaks or the false valleys from a count of the peaks or the valleys within the spectrum.

6. The interrogation system of claim 4, wherein the memory device includes instructions executable by the processing device for causing the processing device to:
determine a cavity length of the first sensor by calculating an ideal position of the false peaks or the false valleys using the reference distance.

7. The interrogation system of claim 1, wherein the first sensor and the second sensor are serially multiplexed on one of the one or more fiber-optic cables.

8. The interrogation system of claim 1, wherein the first sensor and the second sensor are multiplexed in parallel in the one or more fiber-optic cables.

9. An optical sensor system, comprising:
a first sensor positionable in a wellbore to generate a first signal;
a second sensor positionable in the wellbore to generate a second signal; and
a processing device couplable the first sensor and the second sensor for which instructions executable by the processing device are used to cause the processing device to determine a reference distance in a wavenumber domain between peaks or valleys detected in the first signal within a dedicated wavelength range of the first sensor, the reference distance being useable to determine false peaks or false valleys introduced within a spectrum of light signals including the first signal and the second signal by interference from the second sensor.

10. The optical sensor system of claim 9, further comprising a spectrometer couplable to the first sensor and the second sensor to receive the spectrum of light signals.

11. The optical sensor system of claim 9, further comprising a memory device including instructions executable by the processing device for causing the processing device to:
determine a detected distance between detected peaks or detected valleys in the spectrum within a shared wavelength range of the first sensor and the second sensor; and
determine the false peaks or the false valleys within the spectrum by comparing the detected distance and the reference distance.

12. The optical sensor system of claim 11, wherein the first sensor includes a fiber Fabry-Perot interferometric sensor and the second sensor includes a fiber Bragg grating sensor,
wherein the memory device includes instructions executable by the processing device for causing the processing device to determine a cavity length of the fiber Fabry-Perot interferometric sensor by discarding the false peaks or the false valleys from a count of the peaks or the valleys within the spectrum.

13. The optical sensor system of claim 9, further comprising a light source couplable to the first sensor and the second sensor to transmit interrogation light signals to the first sensor and the second sensor.

14. The optical sensor system of claim 9, wherein the first sensor and the second sensor are serially multiplexed on a fiber-optic cable.

15. The optical sensor system of claim 9, wherein the first sensor and the second sensor are multiplexed in parallel in two or more fiber-optic cables.

16. A method, comprising:
receiving a spectrum of light signals, the spectrum including a first light signal from a first sensor positioned in a wellbore and a second light signal from a second sensor positioned in the wellbore, the first light signal having a first wavelength range and the second light signal having a second wavelength range sized to create a dedicated wavelength range within the first wavelength range that does not overlap with the second wavelength range;
determining a reference distance in a wavenumber domain between peaks or valleys in the first light signal within the dedicated wavelength range;
determining a detected distance between detected peaks or detected valleys in the spectrum within the second wavelength range; and
determining a false peak or a false valley introduced within the second wavelength range due to interference from the second sensor by comparing the reference distance and the detected distance.

17. The method of claim 16, wherein determining the false peak or the false valley includes:
- comparing the detected distance and the reference distance to generate a percentage value representing a size of an expected distance between actual peaks or actual valleys within the spectrum; and
- identifying the false peak or the false valley in response to the percentage value being greater than a predetermined threshold value.

18. The method of claim 17, further comprising calculating a cavity length of the first sensor by discarding the false peak or the false valley from a count of the detected peaks or the detected valleys within the spectrum.

19. The method of claim 16, wherein the first sensor and the second sensor are serially multiplexed in a fiber-optic cable positioned in the wellbore.

20. The method of claim 16, wherein the first sensor and the second sensor are multiplexed in parallel in fiber-optic cables positioned in the wellbore.

* * * * *